(12) United States Patent
Chen

(10) Patent No.: US 12,468,606 B2
(45) Date of Patent: Nov. 11, 2025

(54) MANAGEMENT OF LOGS AND CACHE FOR A GRAPH DATABASE

(71) Applicant: TigerGraph, Inc., Redwood City, CA (US)

(72) Inventor: Songting Chen, Portola Valley, CA (US)

(73) Assignee: TigerGraph, Inc., Redwood City, CA (US)

(*) Notice: Subject to any disclaimer, the term of this patent is extended or adjusted under 35 U.S.C. 154(b) by 24 days.

(21) Appl. No.: 18/447,684

(22) Filed: Aug. 10, 2023

(65) Prior Publication Data

US 2024/0061754 A1 Feb. 22, 2024

Related U.S. Application Data

(60) Provisional application No. 63/371,846, filed on Aug. 18, 2022.

(51) Int. Cl.
*G06F 16/20* (2019.01)
*G06F 11/14* (2006.01)
*G06F 16/2455* (2019.01)
*G06F 16/27* (2019.01)

(52) U.S. Cl.
CPC ...... *G06F 11/1471* (2013.01); *G06F 11/1451* (2013.01); *G06F 16/24552* (2019.01); *G06F 16/27* (2019.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,301,600 B1 * | 10/2012 | Helmick | ............. | G06F 11/2094 707/648 |
| 10,120,924 B2 * | 11/2018 | Wong | ....................... | G06F 11/08 |
| 10,366,106 B2 * | 7/2019 | Fan | ......................... | G06F 16/273 |
| 2015/0066857 A1 * | 3/2015 | Dayal | ................... | G06F 16/128 707/639 |
| 2023/0062434 A1 * | 3/2023 | Wagner | ................ | G06Q 20/405 |
| 2023/0376467 A1 * | 11/2023 | Jenkins | ................. | G06F 16/215 |

* cited by examiner

*Primary Examiner* — Belix M Ortiz Ditren

(57) ABSTRACT

Systems, methods, and software described herein manage logs and cache storage for a graph database. In one implementation, a replica in a cluster of replicas, identifies an update associated with a graph database. In response to the update, the first replica determines whether a quorum exists for the update using one or more additional replicas and, when a quorum exists, generates an entry in a log based on the update.

20 Claims, 5 Drawing Sheets

MANAGEMENT OF LOGS AND CACHE FOR A GRAPH DATABASE

RELATED APPLICATIONS

This application hereby claims the benefit of and priority to U.S. Provisional Application No. 63/371,846, titled "MANAGEMENT OF LOGS AND CACHE FOR A GRAPH DATABASE," filed Aug. 18, 2022, which is hereby incorporated by reference in its entirety.

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called lines or edges. The edges establish relationships (connections) between the vertices. Graphs can be directed or undirected. In an undirected graph, an edge from first point to a second point is the same as a line from the second point to the first point. In a directed graph, the two directions are treated as distinct directed edges.

As graphs increase in size, difficulties can arise in efficiently managing the storage of the graphs. Specifically, as the number of vertices and edges grow, graphs may require distributed storage that can use local resources, cloud resources, or some combination thereof. Consequently, an organization can encounter issues in efficiently managing the data in the graph or performing queries to the graph.

OVERVIEW

Provided herein are systems and methods of managing logs and cache storage for a graph database. In one implementation, a computing environment includes replicas that maintain logs associated with updates to the graph database, wherein the replicas may each comprise a computing system in a first geographic location (e.g., on premises data center of computer environment). A first replica of the replicas identifies an update associated with a graph database. In response to the request, the first replica determines whether a quorum exists for the update using other replicas. If a quorum exists for the update, the first replica generates an entry in a log based on the update.

In some implementations, the replicas can be used to update a second data store, wherein the second data store is in a second geographic location. The updates can include maintaining snapshots associated with the graph database, wherein the data store can store information associated with multiple snapshots.

In some implementations, the replicas can be used to provide high availability, wherein a failure of a first replica can be supported by a second replica. The remaining replicas can identify the failure of the first replica and select the second replica to take the place of the first replica, wherein replacing the first replica can include communicating with the data store to provide information about updates to the graph database.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
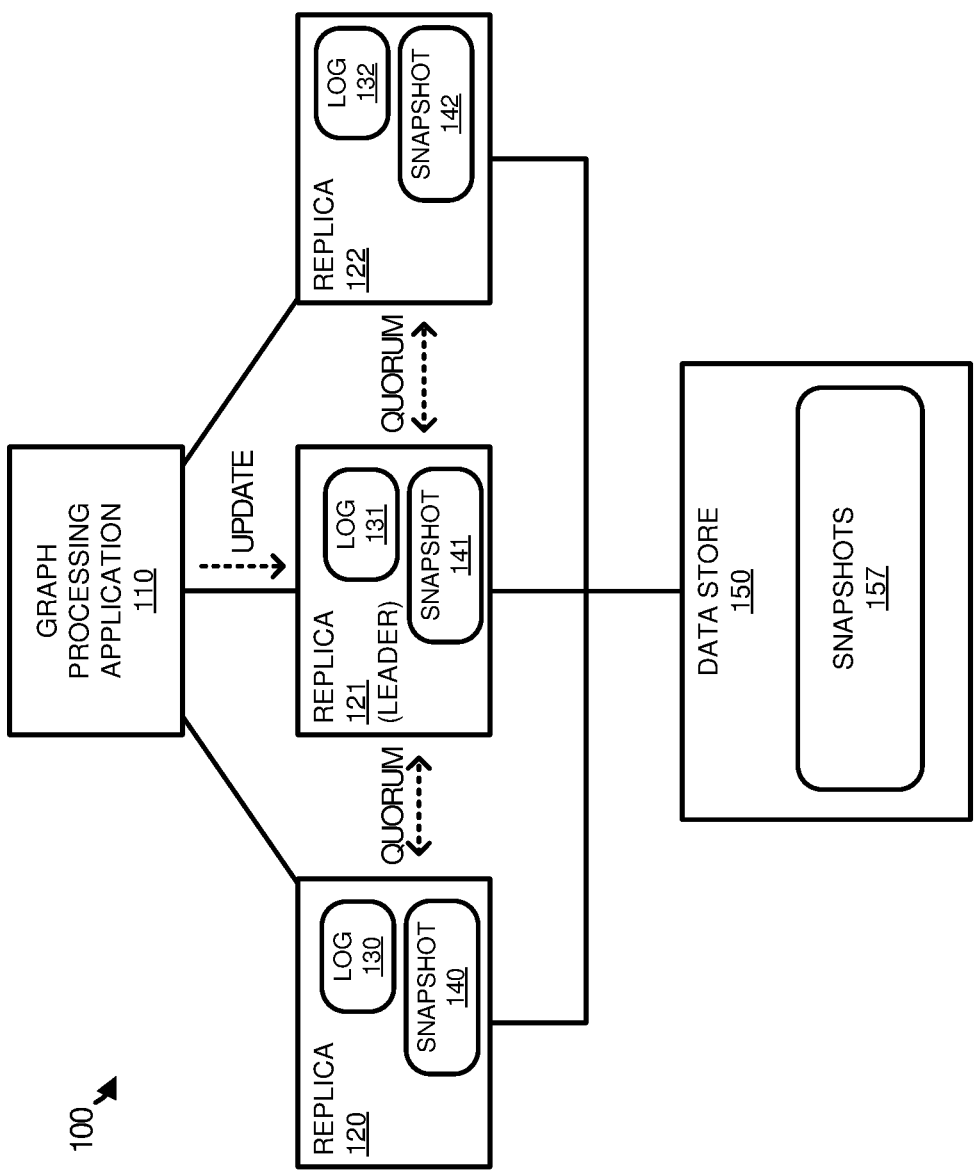
FIG. 1 illustrates a computing environment to manage logs and cache storage for a graph database according to an implementation.

FIG. 1 illustrates a computing environment 100 to manage logs and cache storage for a graph database according to an implementation. Computing environment 100 includes graph processing application 110, replicas 120-122, and data store 150. Graph processing application 110 can execute on one or more computers to provide graph processing operations on a graph database. Graph processing application 110 can execute on one or more computers or can execute at least partially on replicas 120-122. The operations from graph processing application 110 can include adding, removing, or modifying data in the graph database, performing queries on the data of the graph database, or providing some other operation. In addition to graph processing application 110, replicas 120-122 can be used to store data associated with the graph database. Replicas 120-122 store logs 130-132 that represent updates to snapshots 140-142 of the graph, wherein each snapshot of snapshots 140-142 are representative of a portion of the data in association with the overall graph. The snapshot can include data for the graph and can also include one or more secondary indexes, wherein the secondary indexes can index data for the graph using a second value that is different than the index for the data vertices of the graph. As an example, a primary index can uniquely identify data vertices in a graph, while a secondary index represents attributes (location information, age, or some other attribute associated with the data instance vertices). Thus, in a social network, the data instance vertices or users can be indexed using a first unique value, but secondary index information can index attributes associated with the users. Data store 150 stores snapshots 157 that can correspond to snapshots of a graph at different periods, wherein the snapshots comprise the full state of the graph at different periods. Advantageously, while each replica of replicas 120-122 store a portion of the graph (e.g., recently used, recently modified, and the like), data store 150 can store the complete graph that can be accessed by the replicas if required to respond to queries.

In operation, graph processing application 110 can use snapshots 140-142 and logs 130-132 to resolve graph queries associated with the graph represented in snapshots 140-142. The graph can include vertices and edges that correspond to a social network, transaction information, or some other data set. The queries can be used to identify data within the graph, identify information about the connections between vertices in the graph (e.g., transactions between entities represented in the graph), identify shortest paths between entities represented as vertices in the graph, or provide some other operation in association with the graph. When graph processing application 110 generates an update for a graph, such as adding, removing, or modifying vertices and/or edges, the update can be reflected in a log entry for logs 130-132. The log entry can include a key-value pair, wherein the key can be used to identify the order of the updates and the value can indicate the modification itself.

As an example, graph processing application 110 can generate a new vertex for a graph represented in snapshots 140-142. In response to the update with the new vertex, replica 121 can add an entry to log 131 reflecting the addition of the vertex. Additionally, replicas 120 and 122 can update logs 130 and 132 to reflect the addition of the vertex. Advantageously, each replica of replicas 120-122 can mirror the requested modifications to the graph. Once logs 130-132 satisfy one or more criteria for a synchronization event, logs 130-132 can be used to update local snapshots 140-142. Replica 121 can further update data store 150 to reflect the updates from graph processing application 110, wherein the updates can be communicated to data store 150 during a synchronization event. The updates can be communicated periodically, during processing downtime associated with the replica, or at some other interval. Here, as replica 121 is elected as the leader of replicas 120-122, replica 121 can communicate the updates to data store 150. Further, if required, replica 121 can obtain additional data from data store 150 if required to respond to a query. For example, the snapshot at replica 121 may only include a portion of the data associated with the graph. The portion can include the most recently added or updated data, the data used for a most recent query, or some other portion of the graph data. When a query is initiated that requires additional data (e.g., vertices not cached as part of snapshot 141 or log 131), replica 121 can retrieve the required data to respond to the query. Additionally, the retrieved data can be cached as part of the local snapshot at replica 121.

Here, in addition to updating logs 130-132 based on updates from graph processing application 110, replicas 120-122 may determine whether a quorum exists for the modification. A quorum is achieved when a majority of the replicas approves the modification, wherein the approval can be based on a signature provided in association with the update. Specifically, when an operation is performed, graph processing application 110 can sign the modification using an encryption key and each of the replicas can verify the signature by applying another encryption key. Once a quorum is identified for an update, each replica in replicas 120-122 can update a corresponding log of logs 130-132. In some examples, the modifications and queries are directed at the leader, wherein the leader can be elected from the replicas randomly, based on a selection by an administrator, or based on some other factor. The leader can then distribute the modification to the other replicas to determine whether a quorum exists for the modification. In other examples, the modifications and queries can be directed to any of the replicas, but the leader is responsible for updating data store 150.

As the logs are maintained at each of the replicas 120-122, replicas 120-122 can update the local snapshots 140-142. For example, when replica 121 satisfies one or more criteria in association with a synchronization event, replica 121 can update snapshot 141. The one or more criteria can include the number of entries in log 131, a resource usage downtime in association with replica 121, the expiration of a period (e.g., every ten minutes), or some other triggering event. Once the synchronization event occurs, each replica can update the local snapshots 140-142 using the entries in the corresponding log. Each replica can apply all pending entries in the log or can apply a subset of the entries (i.e., entries that correspond to a period).

In addition to using the logs to update a local snapshot, the leader in the replica cluster can update data store 150 in response to a synchronization event. Data store 150 may correspond to a remote or cloud storage service, wherein data store 150 can automatically support duplication of different snapshots 157 and log data 155. Here, replica 121 is allocated the leader from replicas 120-122, wherein replica 121 can be selected at random, based on available resources, or selected by some other means. When a synchronization event occurs, replica 121 can communicate data from log 131 to data store 150. Data store 150 can use the information to keep different snapshots 157 that can be used to update the status of the graph database from a first version to a second version. Data store 150 can store the complete graph data instance vertices, secondary index vertices, and edges, while each of the replicas stores a portion of the graph based on resource constraints at the different replicas.

In some implementations, one or more of the replicas can fail in a cluster. To support the failure, replicas 120-122 may monitor, using heartbeat messages or other exchanges, to determine whether another replica is available. A failure of a replica can include a power failure, a software failure, a networking failure, or some other failure. For example, replica 122 can determine that replica 121 is failed when a heartbeat message is not returned within a period or replica 121 provides an indication to replica 122 indicating the failure. In examples, where a quorum can be maintained for the cluster, the cluster can continue to operate without the unavailable replica. For example, if replica 122 were to encounter a failure, replicas 120-121 can continue to determine whether a quorum exists for the update and maintain logs 130-131 based on the verified updates. When replica 122 becomes available again, replica 122 can retrieve log entries that were missed from replica 120 and/or replica 121.

In examples when the failed replica comprises the leader, the remaining replicas can select a new leader replica from the remaining available replicas. Accordingly, when a failure is identified for replica 121, replicas 120 and 122 can select a new leader, wherein the new leader can update data store 150. When replica 121 becomes available again, replica 121 can update log 131 and/or snapshot 141 using the information from replica 120 and/or replica 122.

As logs 130-132 and snapshots 140-142 are maintained by replicas 120-122, graph processing application 110 can generate queries to the graph database. Rather than directing the queries to data store 150, a query response can be generated using the information from a replica of replicas 120-122. In some examples, graph processing application 110 can direct queries based on the identity of the leader, based on a random selection of a replica from replicas 120-122, or based on some other mechanism. The response to the query can be generated using the snapshot with the application of required entries from the corresponding log of the replica. The application of the entries from the log can be used to reflect the desired period of the graph to support the request. In some examples, a replica, such as replica 121, may only store a portion of the graph based on storage constraints of replica 121. As a result, the data required to respond to the query must be retrieved from data store 150 that maintains the overall state of the graph and the retrieved data can be used to respond to the query. Additionally, the retrieved data can be cached as part of the local snapshot at replica 121.

In some implementations, each replica of replicas 120-122 can store or cache the snapshot in different tiers of storage on the replica. The data that is most frequently used can be cached in faster random-access memory rather than disk or solid-state storage. For example, using replica 121, log 131 and the most frequently used data from snapshot 141 can be maintained in memory, while non-frequently used data from the snapshot is stored to disk (solid state, hard disk, etc.). Additionally, data that is incapable of being stored locally due to resource constraints on the replica can be retrieved from the data store and cached as required to support queries to the graph.

Figure 2:
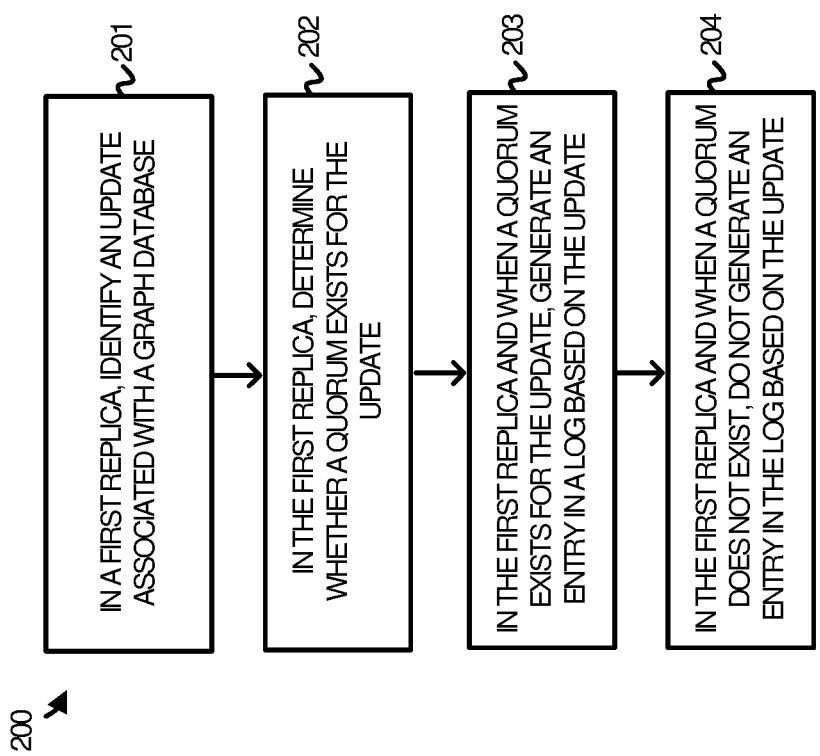
FIG. 2 illustrates a method of operating a replica to manage a log associated with a graph database according to an implementation.

FIG. 2 illustrates a method 200 of operating a replica to manage a log associated with a graph database according to an implementation. The steps of method 200 are referenced parenthetically in the paragraphs that follow with reference to systems and elements of computing environment 100 of FIG. 1.

Method 200 includes, in a first replica, identifying (201) an update associated with a graph database. The update can include adding, removing, modifying, or performing some other update operation in association with one or more vertices and/or edges of the graph database. In response to the update request and in the first replica, method 200 further provides for determining (202) whether a quorum exists for the update using one or more additional replicas. As demonstrated in computing environment 100, replicas can be deployed as a cluster that support high availability, wherein the cluster can be used to verify updates to the graph database and provide failover support during a failure of one of the replicas. For example, replica 121 represents the leader of the cluster, wherein replicas 120 and 122 provide follower support. An update generated by graph processing application 110 can request to generate a new vertex in the graph database. In addition to providing the request to leader replica 121, the request is also communicated to replicas 120 and 122, permitting replicas 120 and 122 to verify the signature associated with the update. The signature may comprise an encryption mechanism that verifies the source of the update, wherein sources without the required signature can be incapable of implementing an update. For example, while a first application or first client is permitted to update the graph database a second application or second client will not be permitted to modify the database. When the update request is received, the signature or encryption key used to sign the update can be used by the replicas 120-122 to determine whether the request was initiated by the first or second application. When the request originates from the second application, a replica can identify that the request is not permitted and indicate its finding to the other replicas in the cluster. Similarly, when a request originates from the first application, a replica can identify that the request is permitted based on the signature associated with the request and indicate the request is permitted to one or more of the other replicas. Based on the determinations from the replicas, the replicas can determine whether a quorum exists for the request. Specifically, in computing environment 100, whether two of the replicas approve the update to the graph database (i.e., reach a quorum).

When a quorum is reached for the update, method 200 further includes, in the first replica, generating (203) an entry in a log based on the update. The entry can comprise a key-value pair in some examples, wherein the key can indicate the sequence of the update or uniquely identify the update, while the value can reflect the update itself. For example, an entry in the log for a new vertex can indicate when the update was generated and can further indicate attributes associated with the vertex. Advantageously, the log can reflect the order at which changes occur in the graph data structure. In examples where a quorum is not reached for the update, method 200 provides, in the first replica, preventing (204) the generation of a log entry. This will prevent unknown or unpermitted applications from making changes in the graph database.

The steps of method 200 can be implemented by any replica of replicas 120-122. In some implementations, a replica in the cluster is designated as the leader, wherein the leader is responsible for providing updates to the remote data store. For example, replicas 120-122 can be in a first data center, while data store 150 is in one or more remote data stores, such as a cloud service provider that can duplicate snapshots and other log data associated with the graph database. Data store 150 can store more information than each of the replicas, permitting versioning information to be stored remotely. Additionally, the snapshots of replicas 120-122 may only represent a portion of the data for the graph based on storage and resource constrains of the replicas. The replicas can store the most recently modified, most recently queried, or most often queried data, while data store 150 can store all the data in association with the graph. If required, data can be retrieved from the data store to respond to a newly generated query. In some examples, the leader can, in response to a synchronization event, provide information about updates from the log to data store 150. The synchronization event can occur when entries in the log satisfy a threshold, can occur at the expiration of a timer, can occur during a resource downtime for replica or the network between the replica and data store 150, or can occur at some other interval. The same synchronization event or different synchronization events can also be used to update the local snapshot of the graph database on the replica. Once updated, one or more of the log entries can be deleted from the log as they are implemented in the snapshot.

Figure 3:
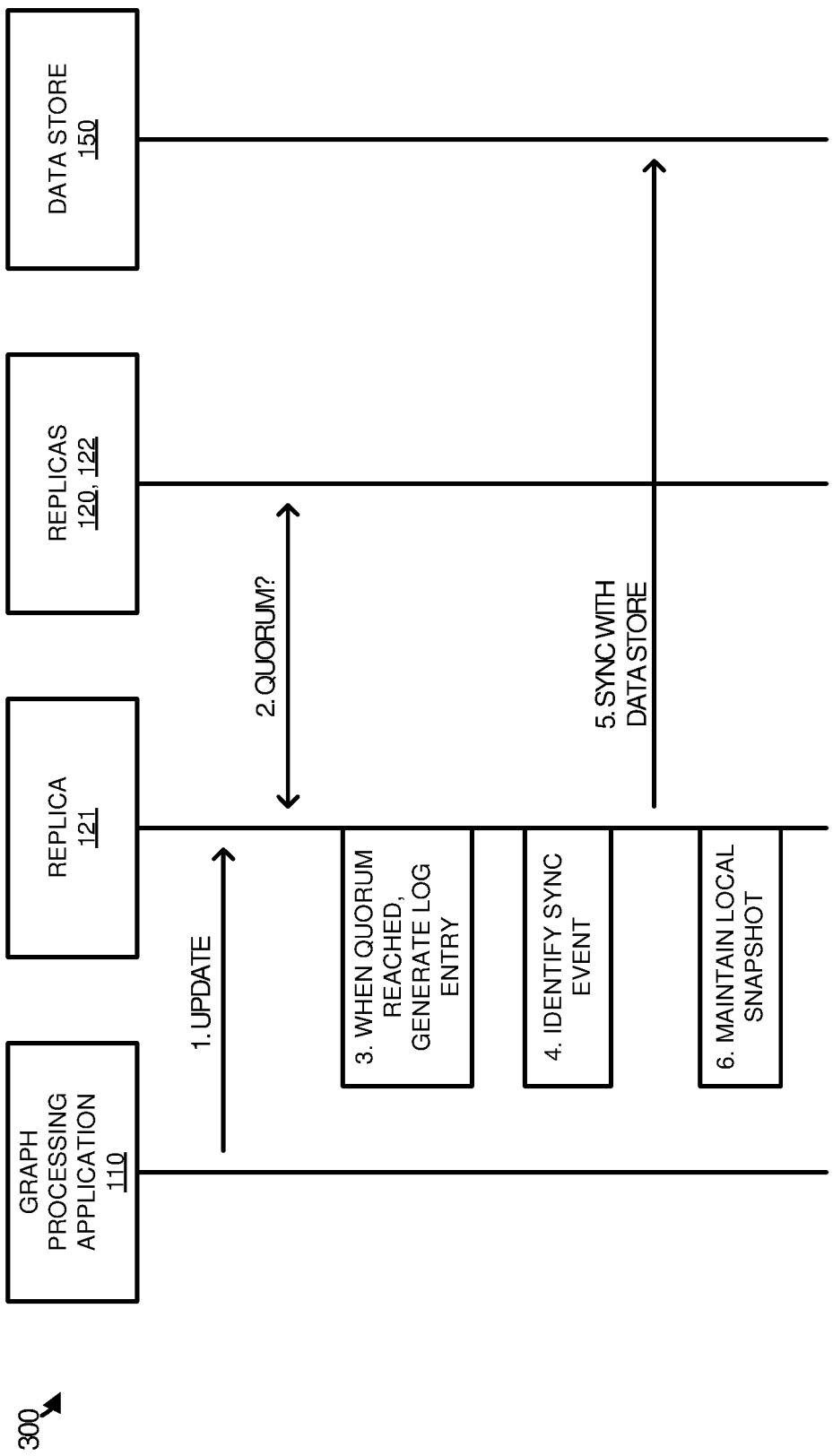
FIG. 3 illustrates an operational scenario of maintaining logs and cache storage for a graph database according to an implementation.

FIG. 3 illustrates an operational scenario 300 of maintaining logs and cache storage for a graph database according to an implementation. Operational scenario 300 includes graph processing application 110, replicas 120-122, and data store 150 from computing environment 100 of FIG. 1.

In operational scenario 300, graph processing application 110 generates an update that is received by replica at step 1. After receiving the update, replica 121 determines whether a quorum exists for the update by communicating with replicas 120 and/or 122 at step 2. In some implementations, each of the replicas can be provided with a copy of the update or signature information associated with the update. The information can be provided directly from graph processing application 110, can be distributed via replica 121, or can be provided by some other means. The replicas can determine whether the update is permitted, and when a quorum exists (majority of replicas indicating the update is permitted), replica 121 can generate a log entry that reflects the update at step 3. In some implementations, each of the replicas can perform a signature check on the update that can check to determine whether the source (device, application, etc.) is permitted to make the associated update.

In addition to updating the log at replica 121, other replicas can update a local log to reflect the update. Accordingly, each of the replicas that are available in the cluster can maintain an individual log that corresponds to the updates of the graph database. Advantageously, information about missed updates can be exchanged, such that each replica includes a copy of the update.

As updates are received, replica 121 that acts as the leader of replicas 120-122, identifies a synchronization event at step 4, wherein the synchronization event can be used to communicate the updates from the log to data store 150 at step 5. Data store 150 can comprise one or more datacenters including those provided by a cloud storage provider, capable of storing snapshots of the graph database, wherein the snapshots can correspond to the status of the graph at different periods. The snapshots at data store 150 can include the status of the entire graph at the different periods, whereas a local snapshot at a replica of replicas 120-122 can represent a portion or subset of the current graph data. The synchronization event may comprise an expiration of a timer, the log of replica 121 satisfying a threshold number of entries, a downtime in the networking or resource usage associated with replica 121, or some other interval. In addition to providing the log information to data store 150, replica 121 can further use the same synchronization event or a different event to update the local snapshot at replica 121. As an example, when the log at replica 121 satisfies a threshold number of entries, replica 121 may apply entries associated with the oldest timestamp first to the local snapshot. Replica 121 can apply all the entries in the log or a portion of the entries. In some implementations, as the entries are applied the local snapshot, the entries can be deleted to provide additional storage resources for newer log entries.

In addition to updating the local snapshot and data store 150, replica 121 can maintain a local snapshot that is used to support requests to the graph database at step 6. The local snapshot can be stored using a combination of random-access memory and solid-state or hard disk storage, wherein data that is frequently accessed in the graph database can be stored in the faster (random-access memory), while other data can be stored in the slower (solid-state or hard disk storage). In some implementations, the log may be stored in memory prior to converting or applying the changes to the graph database snapshot. After applying an update, the data associated with the update can be stored in random-access memory or solid-state storage based on the frequency that the data is required to support a query to the graph database. Data for the snapshot that is most frequently used or most recently used can be stored in memory, while data that is not used as frequently can be stored to other local storage (solid-state, disk) on the device. Still further data that does not qualify for the local snapshot can be stored in data store 150.

In some examples, when a query is generated to the graph database, the query can be directed to any of the replicas 120-122 available in the cluster. The data associated with the query can be obtained from the graph database and communicated back to the requesting application. In providing the requested data, the replica can apply one or more log entries if required from the log to the data structure snapshot and respond using the combination of the log and the snapshot. If the data is unavailable at the replica (i.e., data that is not stored as part of the local snapshot), the replica can communicate a request to data store 150 to obtain the required data. Advantageously, requests that correspond to the data currently cached as part of the snapshot at the replica and the locally maintained log at the replica can be resolved using data that is maintained locally, while any requests associated with data that is not currently cached as on the replica can be resolved by obtaining the data from data store 150. Advantageously, queries related to frequently used or recently modified data can be resolved efficiently without obtaining data from the data store. However, when required, data can be obtained from data store 150 (and cached as in the local snapshot of the replica) to respond to the requisite queries.

Figure 4:
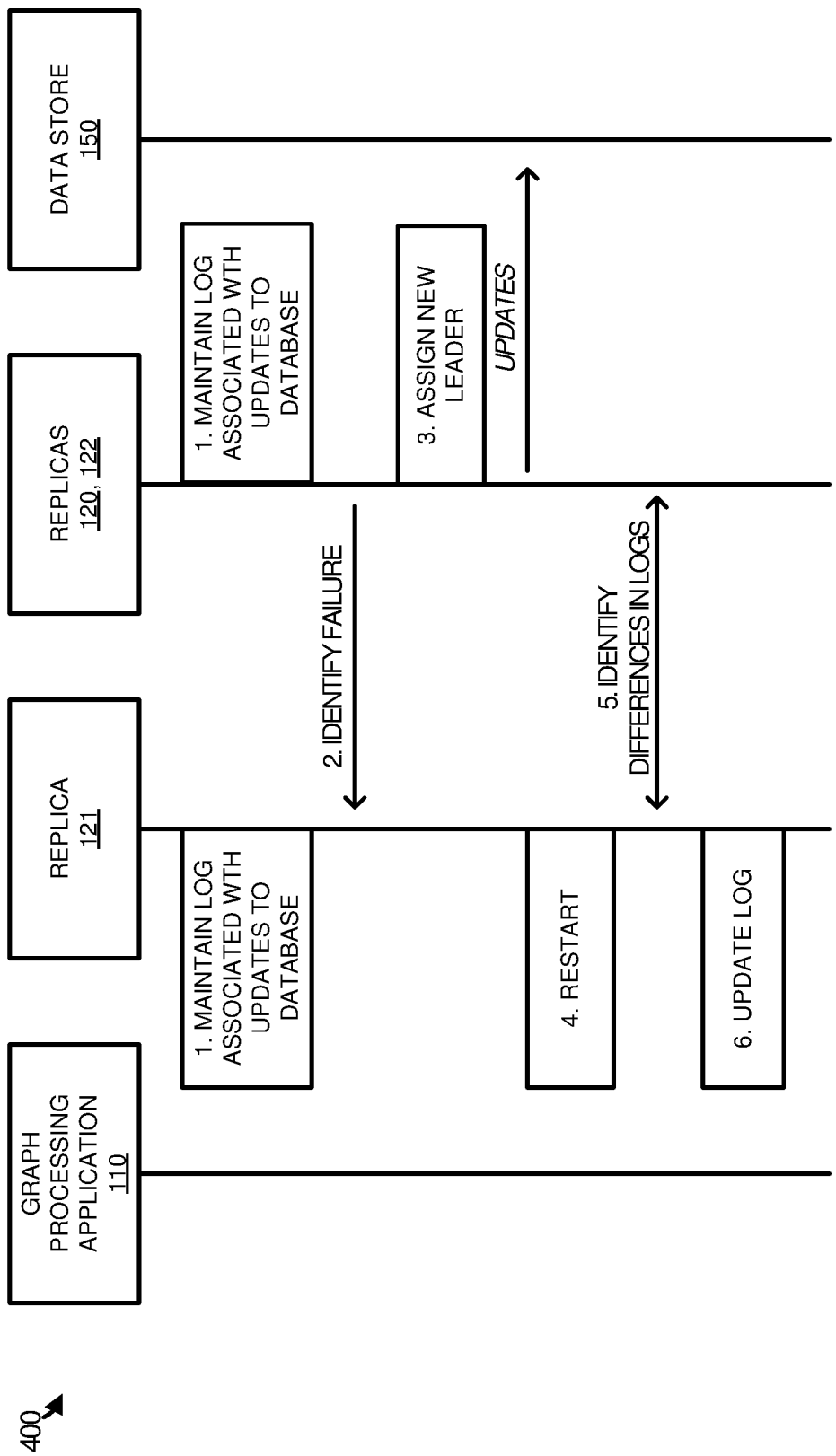
FIG. 4 illustrates an operational scenario of managing a failure of a replica according to an implementation.

FIG. 4 illustrates an operational scenario 400 of managing a failure of a replica according to an implementation. Operational scenario 400 includes graph processing application 110, replicas 120-122 and data store 150 from computing environment 100 of FIG. 1.

In operational scenario 400, replica 121 maintains, at step 1, a log associated with updates to a graph database, wherein the updates can be represented as key-value pairs that indicate at least when the update occurred and the update itself. Additionally, replicas 120 and 122 also maintain a local log that represents the modifications to the graph database, wherein each replica of replicas 120-122 also includes a local snapshot of the database. The snapshot can be used in conjunction with the log to respond to graph queries, wherein the snapshot can be updated via the log to place the graph database in a more current condition. The snapshots can be in the same state across all replicas or can be in a different state across the replicas. The snapshots at each of the replicas represent a portion of the overall graph, wherein each replica's snapshot can comprise most recently updated data for the graph, most frequently accessed data for the graph (i.e., most frequently used data for query response), or other data that is most likely to be used in responding to a query. Similarly, the logs at each of the replicas can include the same entries or can include a different set of entries depending on the state of the current snapshot. For example, a first replica can include a first snapshot with a first number of entries, while a second replica can include a second snapshot with a second number of entries. A replica with a more current snapshot or snapshot more recently updated from the logs may have less entries in the log than a replica with a less current snapshot. The snapshot updates may be accomplished by applying the log entries periodically, when the log reaches a threshold size, when resources are available at the replica to support the update of the image, or at some other interval.

As each replica of replicas 120-122 maintains the logs and a local snapshot, replicas 120-122 may exchange heartbeat or status notifications to identify failures associated with other replicas. The failures can comprise hardware, software, networking, or some other failure. Here, replicas 120 and/or 122 identify a failure of replica 121 at step 2, wherein replica 121 represents the leader in the cluster that communicates updates associated with the graph database to data store 150. In response to identifying the failure, replicas 120 and 122 select a new leader to act in place of replica 121 at step 3. The selection of the new leader from replicas 120 and 122 can be selected randomly, selected based on resource availability at replicas 120 and 122, or based on some other factor. In some implementations, when assuming the leader operations, the replica can assume addressing or other network addressing from the former leader to maintain continuity in the connections with the graph processing application and data store. Once a leader is selected, the selected leader can provide the updates to data store 150 in place of replica 121.

After a new leader is selected, replica 121 can restart or become available within the cluster at step 4. The availability can be detected using the heartbeat or status messages exchanged between replicas 120-122, wherein replica 121 can indicate to replicas 120 and 122 that it is available to maintain a log and snapshot of the graph database. After identifying the availability of replica 121, replica 121 can obtain update information that was missed during the downtime of replica 121 at step 5. The information can be obtained from the replica that is the leader in the cluster, can be obtained from the replica with the fastest connection with replica 121, can be obtained from multiple replicas, or can be obtained in some other manner. For example, during the downtime of replica 121, six log entries can be generated by replicas 120 and 122. During the restart of replica 121, replica 121 can obtain the six log entries from replica 120 and/or replica 122. Once obtained, replica 121 can update the local log using the information from the other replicas.

In some implementations, when the downtime of replica 121 exceeds a threshold, the log entries at replicas 120 and 122 may be incapable of updating the log at replica 121. This can occur when log entries are deleted at replicas 120 and 122 because of updating the local snapshot of the graph database. In these examples, replica 121 can copy the snapshot and log from an existing replica. Replica 121 can then monitor for new log entries that capture updates following the time of the copied snapshot.

In some examples, the replicas for an organization can be deployed across multiple data centers. For example, an organization can deploy a first set of replicas in a first data center while a second set cluster of replicas is supported at a second data center. When a replica fails and is restarted, the replica can first check to determine whether the local log can be updated using the information from other replicas in the same data center. If the log information is available locally, then the replica can obtain the data from the one or more other replicas in the local data center. If the log information is not available locally, then the log data can be obtained from one or more replicas at the second data center.

In some implementations, a first cluster of replicas is deployed at a first data center and a second cluster of replicas is deployed at a second data center, wherein the second cluster can provide failover operations associated with the first cluster. Specifically, the replicas at the first data center can be in an active state but communicate stateful information about the log and that graph data structure to the replicas at the second data center. When the replicas at the first data center are incapable of providing a quorum or updating the logs in the first data center, the standby second cluster can be made active. Accordingly, the replicas at the second data center may act in place of the replicas at the first data center to support the updates to the graph database and respond to queries to the graph database.

Figure 5:
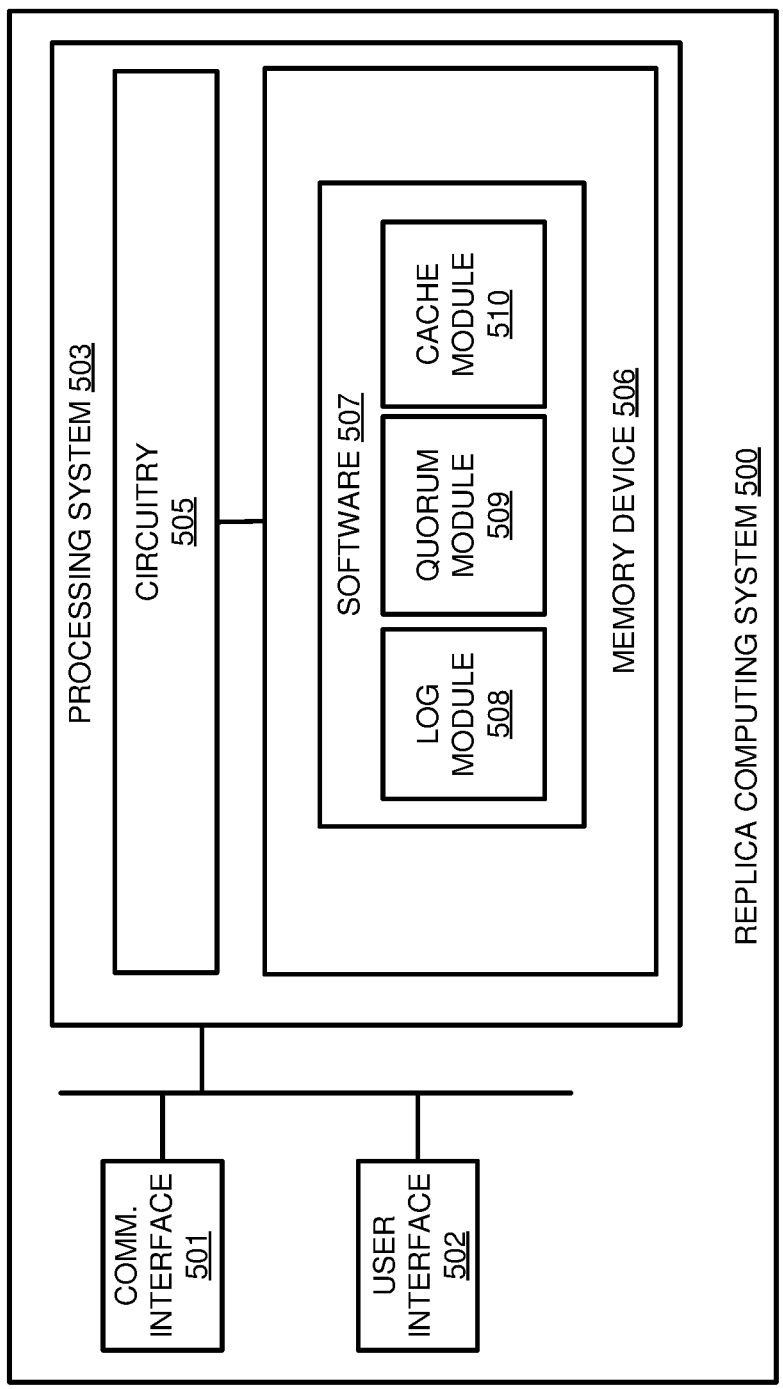
FIG. 5 illustrates a replica computing system to manage logs and cache storage associated with a graph database according to an implementation.

FIG. 5 illustrates a replica computing system 500 to manage logs and cache storage associated with a graph database according to an implementation. Computing system 500 is representative of any computing system or systems with which the various operational architectures, processes, scenarios, and sequences disclosed herein for providing a replica of a graph database snapshot can be implemented. Computing system 500 may be representative of a replica from replicas 120-122, although other examples may exist. Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In at least one implementation, communication interface 501 may be configured to communicate with one or more client systems or graph processing systems capable of generating queries for graphs and updating the data in the graphs. Communication interface 501 can further communicate with a data store, wherein the data store can comprise one or more datacenters that can be in one or more different geographic locations. In at least one example, the data store can comprise a cloud storage service capable of generating multiple duplicates of snapshots and log data associated with the graph database.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing circuitry 505 comprises microprocessor and other circuitry that retrieves and executes operating software 507 from memory device 506. Memory device 506 may include volatile and nonvolatile, removable, and non-removable media implemented in any method or technology for storage of information, such as computer readable instructions, data structures, program modules, or other data. Memory device 506 may be implemented as a single storage device but may also be implemented across multiple storage devices or sub-systems. Memory device 506 may comprise additional elements, such as a controller to read operating software 507. Examples of storage media include random-access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes log module 508, quorum module 509, and cache module 510, although any number of software modules may provide a similar operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, quorum module 509 directs processing system 503 to identify an update in association with a graph database. The graph database can represent transactions in association with an organization, a social network, or some other graph database that includes vertices to represent data objects and edges to represent the connections between the edges. The update can be used to add, remove, modify, or perform some other operation in association with vertices and edges. In response to identifying the update quorum module 509 determines whether a quorum exists for the update using one or more additional replica computing systems. In at least one example, each of the replicas can determine whether the update includes a signature that verifies the update. For example, a graph processing application can generate an update for the graph and sign the update prior to communicating the update to the replicas for the graph. Each of the available replicas can then check the signature using encryption techniques to determine whether the update is valid. When most of the replicas indicate that the update is approved (majority), log module 508 directs processing system 503 to add an entry to the local log, wherein the entry includes a key indicating the order of the update and the update itself. Accordingly, an update can be provided to each of the replicas and, once verified using a quorum of the replicas, an entry can be added to each of the logs. The log entries at each of the replicas can include the same entries, such that a log at a first replica can be used to update the log at a second replica. Advantageously, the duplicate logs can be used when a replica misses an update and can use the other logs to update the local logs.

As the logs are maintained at each of the replicas, including replica computing system 500, log module 508 can update the local snapshot of the graph database. For example, when the local log satisfies one or more criteria in association with a synchronization event, log module 508 can direct processing system 503 to update the local snapshot of the graph database. The one or more criteria can include the number of entries in local log, a resource usage downtime in association with computing system 500, the expiration of a period (e.g., every ten minutes), or some other triggering event. Once the triggering event occurs, each replica in the cluster can update the local log using the entries in the corresponding log. Each replica can apply all pending entries in the log or can apply a subset of the entries (i.e., entries that correspond to a period). In some implementations, the local snapshot replica computing system 500 may comprise a subset of the data for the graph. For example, a graph of ten terabytes can be stored in a remote data store, such as a cloud data store, while a local snapshot can include a terabyte portion of the graph. The portion can comprise the most recently modified portions of the graph, the most frequently used portions of the graph, or some other portion of the graph. Additionally, the local snapshot can include one or more secondary indexes, wherein the secondary indexes can be used to index data instance vertices using an alternative attribute. For example, a social network can include data instance vertices that represent the users, wherein the data instance vertices can be indexed using a unique value to identify each vertex. Additionally, a secondary index can be used to link attributes (e.g., user location) to all users that correspond to that location.

In addition to updating a local snapshot of the graph database, log module 509 can direct processing system 503 to identify a synchronization event to update a remote data store for the graph database. The remote data store may comprise one or more data centers in an alternative physical location from the replicas. The remote data store may comprise a cloud storage service in some examples capable of storing multiple copies of snapshots and update log data associated with the graph database. The synchronization event can occur at the same time as the local update event for the local snapshot, more frequently than the local update, less frequently than the local update, or some other interval. The synchronization event for the external data store may occur simultaneously with the synchronization of the local snapshot or may occur at different intervals than the local snapshot. Log module 509 will only be responsible for updating the remote data store when replica computing system 500 is assigned as the leader in the replica cluster. For example, if a replica cluster employs three replicas, a leader replica can be assigned based on user input, based on resource availability at each of the replicas, random selection or based on some other means.

In some implementations, quorum module 509 further directs processing system 503 to monitor the availability of the other replicas in the cluster. The monitoring can include heartbeat messages that are exchanged between the replicas to determine when a replica is unavailable. If a replica is unavailable and the unavailable replica is the current leader, quorum module 509 may, with the other remaining replicas in the cluster, select a new leader. The new leader can act in place of the unavailable replica to update the remote data store. In some implementations, remaining replicas can also determine whether a quorum is still available to verify each of the updates to the graph database. For example, when a cluster includes three replicas, the cluster can support the failure or unavailability of a single replica, wherein the failure can include communication failures, power failures, software failures, and the like. If a quorum can no longer be established for updates to the graph database, the replicas may prevent future updates from being applied and can generate a notification to a client that indicates the failures associated with the replica cluster.

When the unavailable replica becomes available, such as replica computing system 500, log module 508 directs processing system 503 to communicate with other replicas to identify log entries that were missed during the downtime period. The log entries can be retrieved from the replica with the lowest latency, can be retrieved from the current leader replica, or can be selected in some other manner. Once the entries are obtained, log module 508 directs processing system 503 to update the local log for replica computing system 500.

In addition to maintaining a local log and snapshot for the graph database, cache module 510 directs processing system 503 to identify a query from a graph processing application. In response to the request, cache module 510 can apply any required logs to the existing snapshot and respond to the query based on the application of the log entries. In some examples, the data from any of replicas can be used by the graph processing application. The graph processing application may use a distributed algorithm to select a replica from the available replicas if required. In some examples, a query may require data that is not local stored in the snapshot of replica computing system 500. To respond to the query, replica computing system 500 can obtain the data from the remote data store and respond to the query using the retrieved data. The data can also be cached at replica computing system 500, while stale data is removed from the local snapshot. The cached data can then be used in association with future queries without the delay of requesting and obtaining the data from the remote data store.

In some implementations, cache module 510 directs processing system 503 to cache the local snapshot data that is most frequently used in random-access memory, while less used data in association with the graph database is stored on solid-state or hard disk storage. If required, data can be swapped out of the random-access memory to support the query from the graph processing application. For example, cache module 510 can direct processing system 503 to replace any data that has been identified as stale or timed out with other more likely to be accessed data. Additionally, the most recently modified, or the log associated with the graph database can be stored in random-access memory, such that the log entries can be applied in association with queries and in updating the local snapshot of the graph database. Further, cache module 510 can obtain data that is not stored in the local snapshot from the remote data store to respond to queries.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   in a first replica, identifying an update associated with a graph database;
   verifying a signature provided to the first replica in association with the update;
   in the first replica and in response to verifying the signature, determining a quorum of one or more additional replicas have verified the signature;
   in the first replica and in response to determining the quorum, generating an entry for the update in a log of entries for updates to the graph database; and
   in response to a synchronization event, updating a local snapshot of the graph database at the first replica using the entries from the log.

2. The method of claim 1, wherein the update comprises an addition, deletion, or modification to a vertex or edge in the graph database.

3. The method of claim 1 further comprising:
   in the first replica, identifying the synchronization event for the graph database; and
   in the first replica and in response to the synchronization event, communicating one or more entries from the log to a cloud data store that stores the graph database.

4. The method of claim 3, wherein the synchronization event comprises a quantity of entries in the log satisfying a threshold, an expiration of a period, or resource usage of the first replica satisfying one or more criteria.

5. The method of claim 1, wherein the signature is created by signing the update with a first encryption key and wherein the first replica and the quorum of the one or more additional replicas verify the signature using a second encryption key.

6. The method of claim 1 further comprising, in the first replica, maintaining the local snapshot of the graph database.

7. The method of claim 6 further comprising:
   in the first replica, identifying a query to the graph database; and
   in the first replica and in response to the query, generating a query response based on the local snapshot and the log.

8. The method of claim 1 further comprising:
   in the first replica, identifying a second update associated with the graph database;
   verifying a second signature provided to the first replica in association with the second update;
   in the first replica and in response to verifying the second signature, determining a second quorum of the one or more additional replicas does not exist; and
   in the first replica and in response to determining the second quorum does not exist, preventing the second update from being applied in the log.

9. The method of claim 1 further comprising:
   in the one or more additional replicas, identifying a failure of the first replica; and
   in the one or more additional replicas and in response to identifying the failure of the first replica, selecting a second replica in the one or more additional replicas to replace the first replica as a leader.

10. A computing apparatus comprising:
    a storage system;
    a processing system operatively coupled to the storage system; and
    program instructions stored on the storage system to operate a first replica in a cluster that, when executed by the processing system, direct the computing apparatus to:
      identify an update associated with a graph database;
      verify a signature provided to the first replica in association with the update;
      in response to verifying the signature, determine a quorum of one or more additional replicas in the cluster have verified the signature;
      in response to determining the quorum, generate an entry for the update in a log of entries for updates to the graph database; and
      in response to a synchronization event, update a snapshot of the graph database at the first replica using the entries from the log.

11. The computing apparatus of claim 10, wherein the update comprises an addition, deletion, or modification to a vertex or edge in the graph database.

12. The computing apparatus of claim 10, wherein the program instructions further direct the computing apparatus to:
    identify the synchronization event for the graph database; and
    in response to the synchronization event, communicate one or more entries from the log to a cloud store that stores the graph database.

13. The computing apparatus of claim 12, wherein the synchronization event comprises a quantity of entries in the log satisfying a threshold, an expiration of a period, or resource usage of the first replica satisfying one or more criteria.

14. The computing apparatus of claim 10, wherein the signature is created by signing the update with a first encryption key and wherein the first replica and the quorum of the one or more additional replicas verify the signature using a second encryption key.

15. The computing apparatus of claim 10, wherein the program instructions further direct the computing apparatus to maintain a snapshot comprising frequently accessed data in association with the graph database.

16. The computing apparatus of claim 15, wherein the program instructions further direct the computing apparatus to:
    identify a query to the graph database; and
    generate a query response based on the snapshot and the log.

17. The computing apparatus of claim 10, wherein the program instructions further direct the computing apparatus to:

identify a second update associated with the graph database;

verify a second signature provided to the first replica in association with the second update;

in response to verifying the second signature, determine a second quorum of the one or more additional replicas does not exist; and in response to determining the second quorum does not exist, prevent the second update from being applied in the log.

18. A system comprising:

a plurality of replicas, wherein each replica comprises at least one computer; and a first replica in the plurality of replicas configured to:
identify an update associated with a graph database;
verify a signature provided to the first replica in association with the update;
in response to verifying the signature, determine a quorum of one or more additional replicas in the plurality of replicas have verified the signature;
in response to determining the quorum, generate an entry for the update in a log of entries for updates to the graph database; and
in response to a synchronization event, update a snapshot of the graph database at the first replica using the entries from the log.

19. The system of claim 18, wherein the first replica is further configured to:

identify the synchronization event for the graph database; and communicate one or more entries from the log to a cloud data store that stores the graph database.

20. The system of claim 18, wherein one or more replicas of the plurality of replicas are configured to:

identify a failure of the first replica; and in response to identifying the failure of the first replica, select a second replica in the one or more replicas to replace the first replica as a leader, wherein the leader updates snapshots in a cloud data store.

* * * * *